INVENTORS
M. P. BUDNEY
H. S. BUDNEY
T. W. BUDNEY
M. F. SACZAWA

BY *A. Yates Dowell*,
ATTORNEY

April 5, 1960 M. P. BUDNEY ET AL 2,931,253
JIG BORER
Filed April 13, 1956 6 Sheets-Sheet 4

INVENTORS
M.P. BUDNEY
H.S. BUDNEY
T.W. BUDNEY
M.F. SACZAWA

BY A. Yates Dowell,
ATTORNEY

April 5, 1960  M. P. BUDNEY ET AL  2,931,253
JIG BORER
Filed April 13, 1956  6 Sheets-Sheet 5
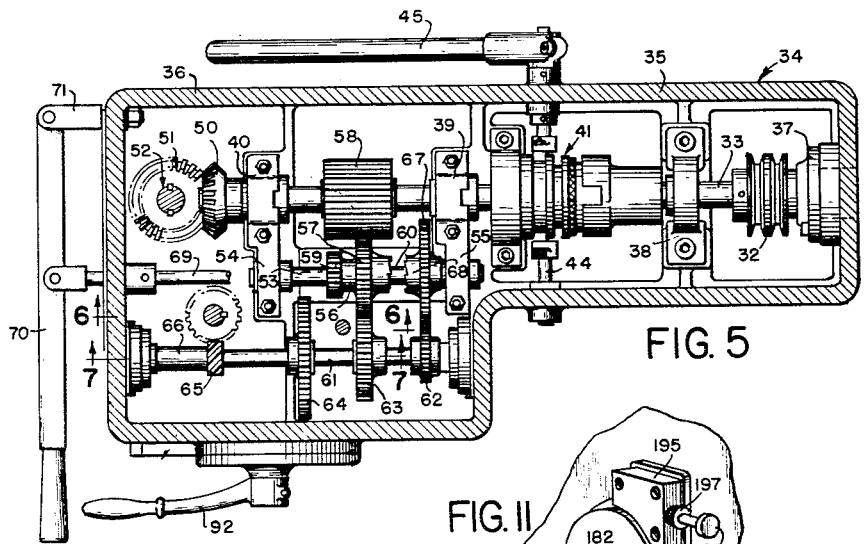
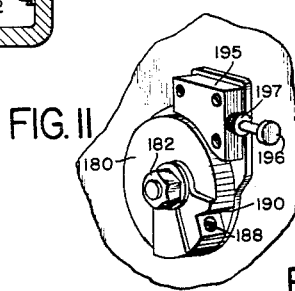
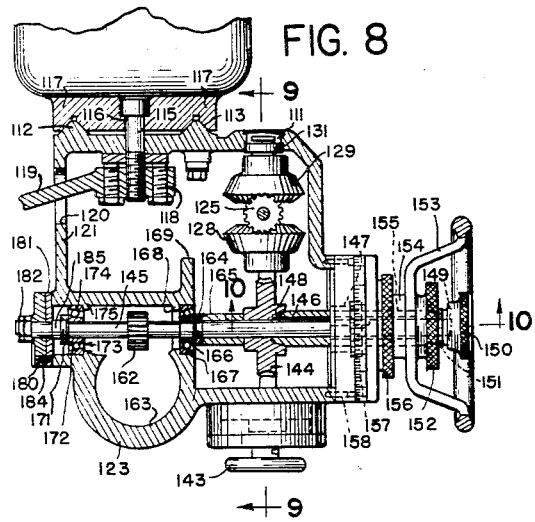
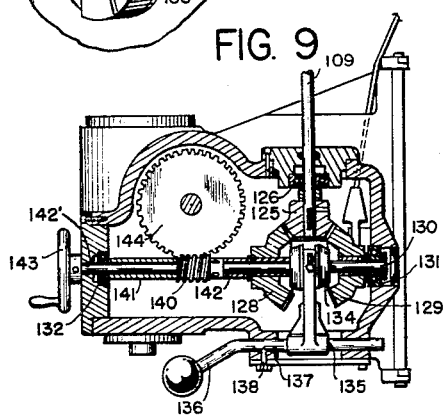
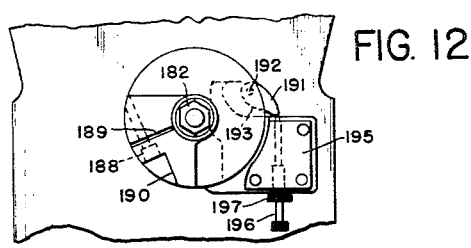
INVENTORS
M. P. BUDNEY
H. S. BUDNEY
T. W. BUDNEY
M. F. SACZAWA
BY A. Yates Dowell
ATTORNEY April 5, 1960   M. P. BUDNEY ET AL   2,931,253
JIG BORER
Filed April 13, 1956   6 Sheets-Sheet 6
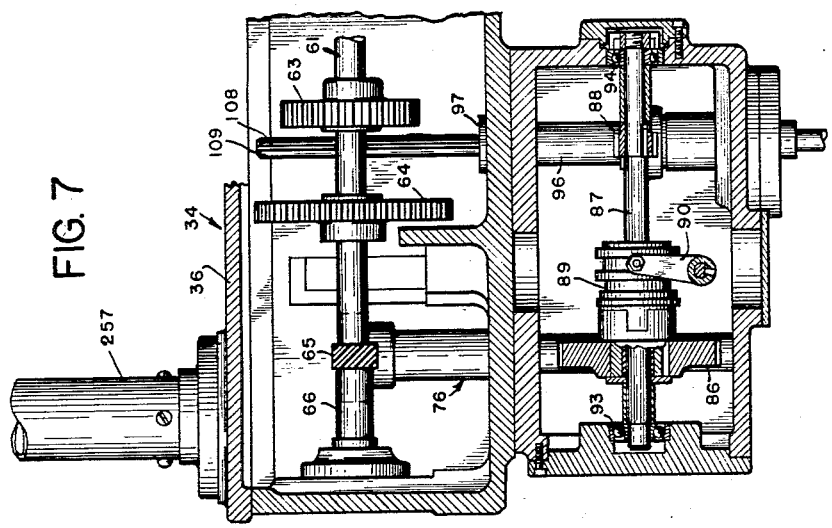
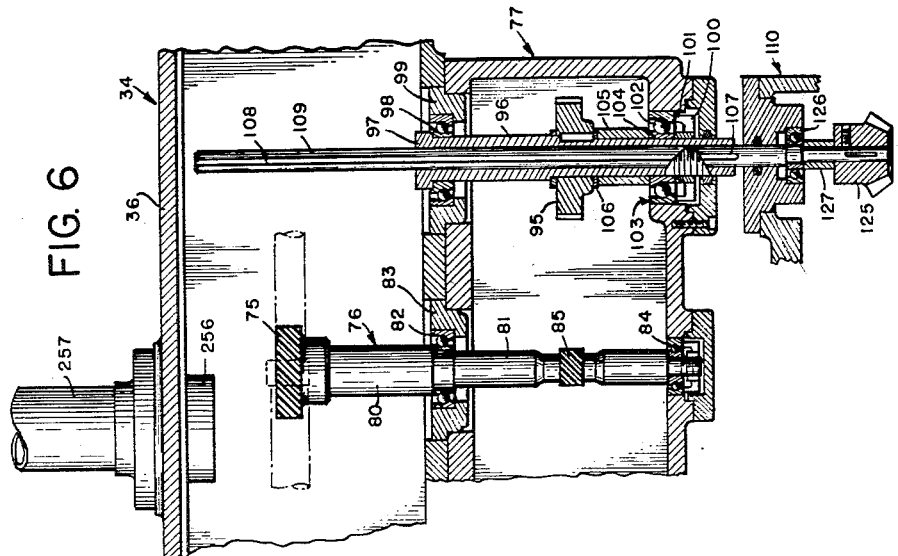
INVENTORS
M. P. BUDNEY
H. S. BUDNEY
T. W. BUDNEY
M. F. SACZAWA
BY *A. Yates Dowell*
ATTORNEYS United States Patent Office 2,931,253
Patented Apr. 5, 1960

2,931,253

JIG BORER

Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.

Application April 13, 1956, Serial No. 578,007

11 Claims. (Cl. 77—4)

This invention relates to machine tools and more specifically to a machine adapted for precision boring and generally known as a jig borer.

An object of the invention is to provide an improved jig borer machine.

A further object is to provide a jig borer having an improved power transmitting mechanism from the source of power to the spindle and to the elevating mechanism for the quill.

A further object is to provide an improved driving means from the step transmission to the quill feed mechanism and which is conveniently accessible to the operator for operation, inspection and repair.

A further object is to provide an improved spindle and quill driving and supporting mechanism in which the quill is supported, guided, and traversed close to the cutting tool end in order to promote accuracy of tool movement.

A further object is to provide an improved quill elevating mechanism which is rapidly adjustable manually and which provides for the continuous indication of the elevation of the cutter with respect to the workpiece.

A further object is to provide an improved spindle means for the movable spindle supporting head and which is easily and quickly adjustable by the operator.

A further object is the provision of improved stop means for the vertical feed of the spindle, affording accuracy in the depth of boring.

Figure 1:
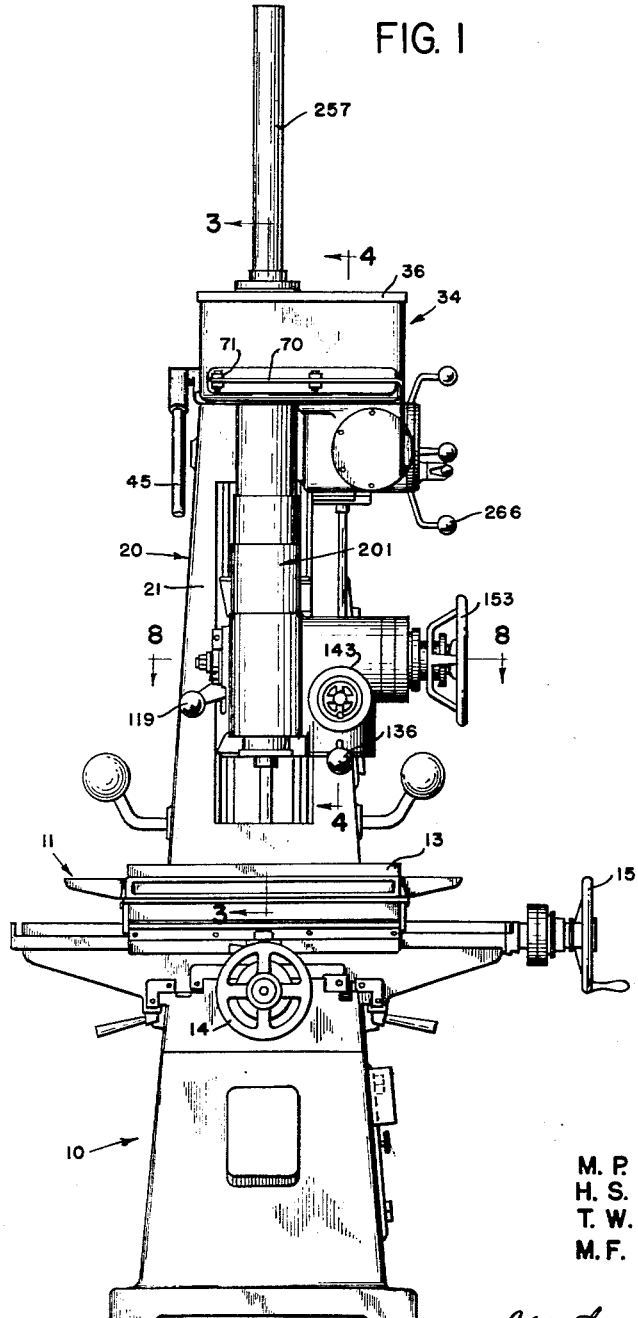
Figure 2:
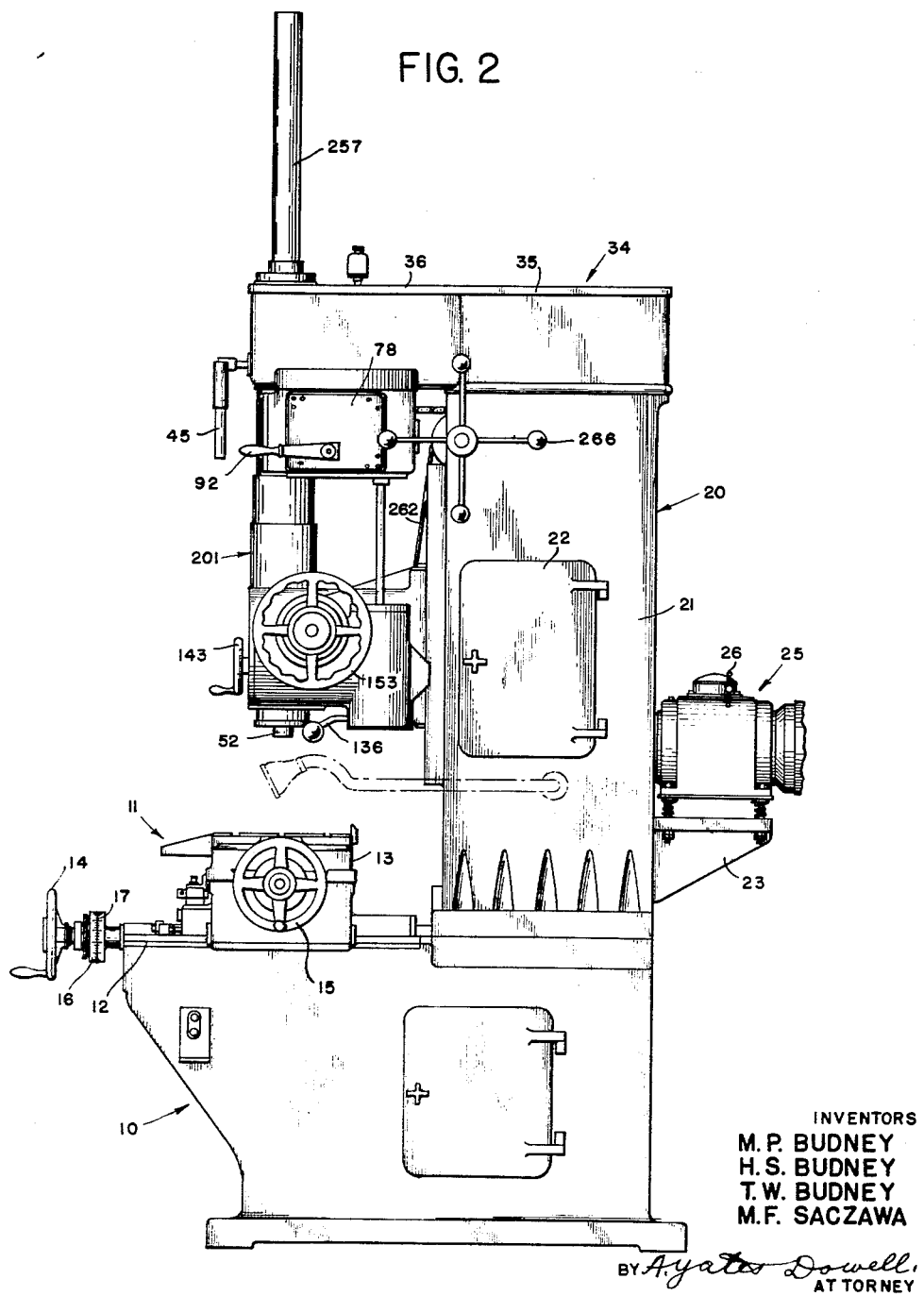
Figure 3:
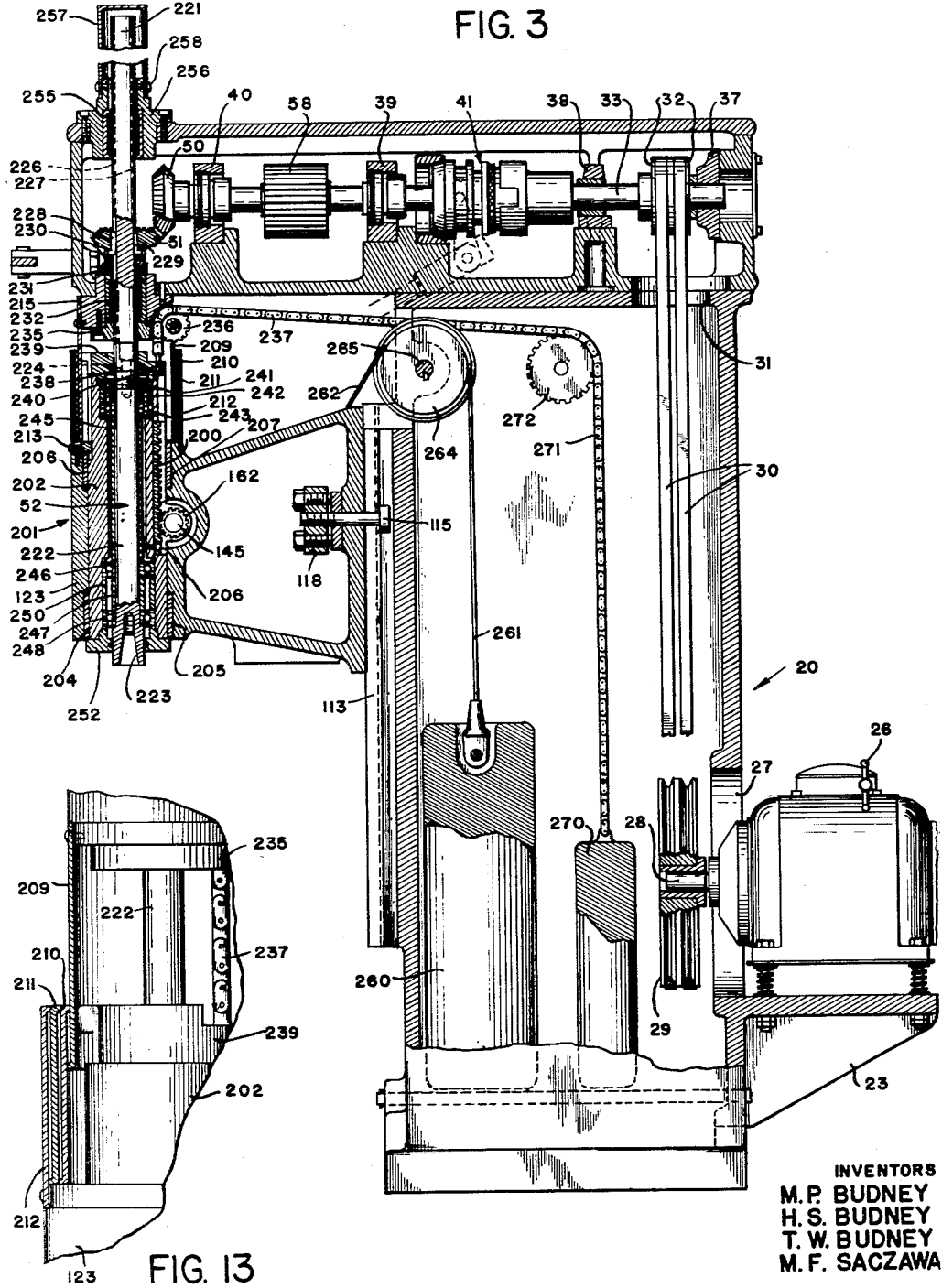
Figures 4, 10:
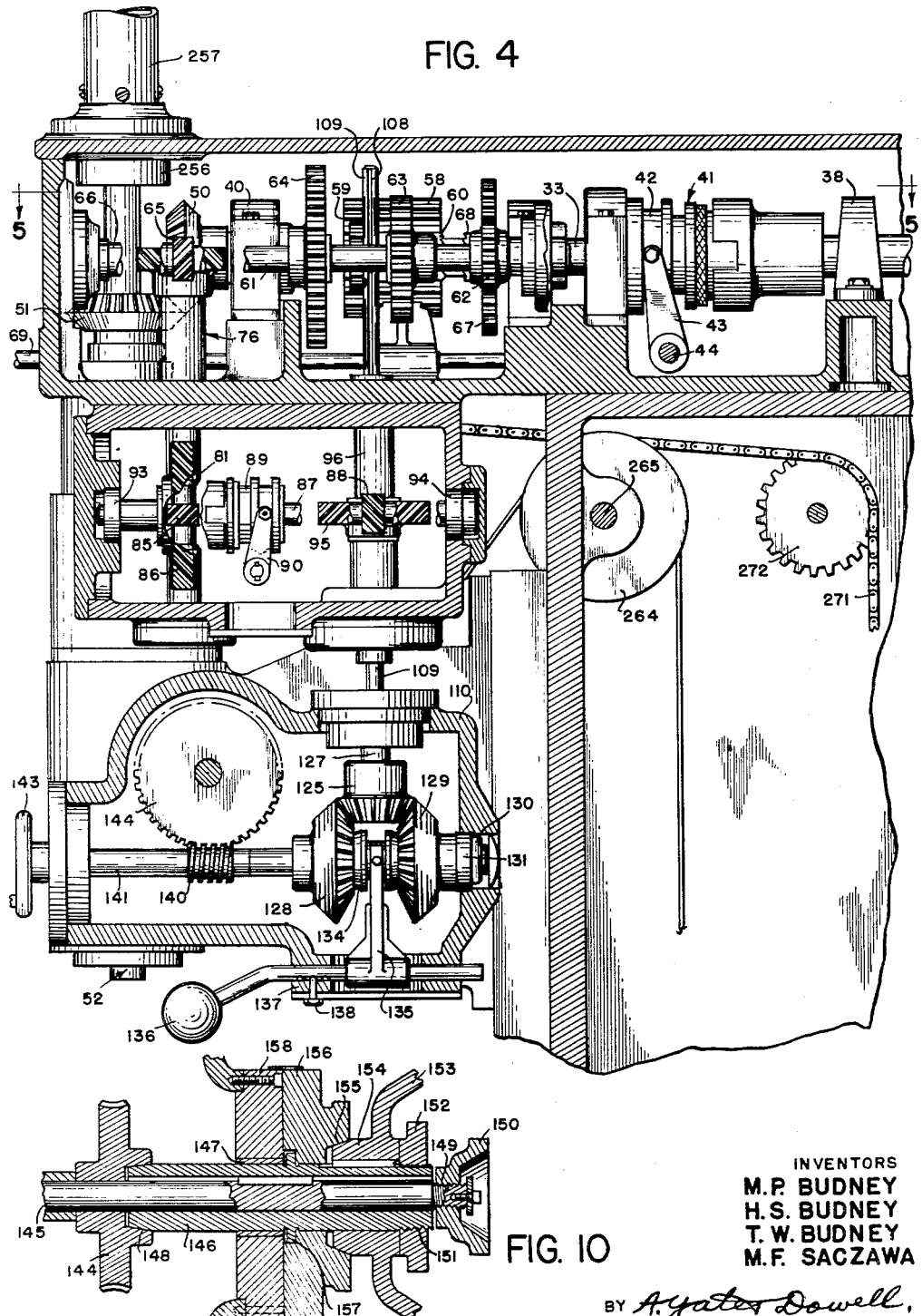

These and other objects of the invention will become apparent from the following description in conjunction with the accompanying drawings in which:

Fig. 1 is a front elevation of a jig borer constructed in accordance with the present invention;

Fig. 2, a side elevation of the machine of Fig. 1;

Fig. 3, a section to an enlarged scale on the line 3—3 of Fig. 1;

Fig. 4, a fragmentary section to an enlarged scale, with certain parts broken away and others in section for greater clarity, on the line 4—4 of Fig. 1;

Fig. 5, a section to a reduced scale on the line 5—5 of Fig. 4;

Fig. 6, a fragmentary section to an enlarged scale on the line 6—6 of Fig. 5;

Fig. 7, a fragmentary section to an enlarged scale on the line 7—7 of Fig. 5;

Fig. 8, a fragmentary section to an enlarged scale on the line 8—8 of Fig. 1;

Fig. 9, a section on the line 9—9 of Fig. 8;

Fig. 10, a fragmentary section on the line 10—10 of Fig. 8;

Fig. 11, a perspective to an enlarged scale of the adjustable stop mechanism;

Fig. 12, an end view of the adjustable stop mechanism; and

Fig. 13, a fragmentary elevation, partly in section and to an enlarged scale, of the telescopic sleeves which cover the spindle and quill, in slightly extended position.

Briefly stated, the illustrated embodiment of the invention includes a base on which a work table is mounted for holding a workpiece in a selected position. The work table is of conventional construction and includes a workholding means which are designed to position the workpiece according to coordinants, so that the location of holes which are desired to be bored may be accurately determined.

Extending upwardly from the base is a column from the upper portion of which spindle guiding and supporting mechanism extends laterally in order that the cutting tool may be positioned over the work table. The main source of power for the illustrated machine is a Graham variable speed transmission motor which is mounted on the column. Reference may be had to the Graham Patent No. 2,535,409 for the details of the Graham motor. The motor drives pulleys within the column from which belts extend to the end of the transmission assembly at the top of the column.

Mounted at the top of the column and extending outwardly therefrom in a horizontal plane is the transmission assembly. The transmission has a drive shaft which receives power at its rear from the belts driven by the motor and has a clutch operable by a brake lever at the operator's upper left. Forwardly of the clutch is a main drive gear and at the front end of the drive shaft a mitre gear is keyed. The mitre gear meshes with a similar gear at right angles which is slideably keyed to the vertical spindle. A change speed transmission parallel to the drive shaft provides a selection of one of three gear ratios, the shifter therefor being operated by a change gear lever mounted at the front of the transmission.

The cam shaft driven by the tranmission at the selected speed drives a vertical idler shaft in a vertical feed assembly. At the lower portion of the idler shaft a cross feed shaft is driven by the idler shaft, a clutch being interposed in the cross feed shaft which is operable by a handle at the operator's right. The cross feed shaft drives a vertical down-feed shaft which is slideably keyed within a sleeve to which its driving gear is fixed. At the lower end of the down-feed shaft a bevel gear is mounted which is in continuous engagement with a pair of opposed bevel gears rotatably mounted on a horizontal feed shaft. The direction of rotation of the horizontal feed shaft is governed by a friction hub which is keyed thereto and engageable selectively with either of the opposed bevel gears.

The horizontal feed shaft drives a worm in engagement with a worm gear on a shaft having a pinion, the pinion being engaged with a rack mounted on the quill for raising and lowering the spindle.

The lower end of the down-feed shaft including its bevel gear and the opposed bevel gears, the cross feed shaft, the quill travel shaft, the quill, and the spindle, are carried in a quill housing which is slideably mounted in guides on the front face of the column. Within the column a large counter-weight is suspended by a cable and connected to the quill housing. A smaller weight is also suspended within the column for counterbalancing the weight of the quill and spindle within the spindle housing.

The feed shaft to which the worm is attached has an operating handle at the front of the column by means of which the quill may be manually raised or lowered by fine adjustment when the friction hub between the bevel gears is in neutral position. The quill travel shaft on which the pinion is mounted has a friction hub keyed to it by means of which the worm gear may drive the quill travel shaft. A vertical feed hand wheel is frictionably engageable with the quill travel shaft for rapid manual adjustment of the spindle and has associated therewith elevation indicating indices. At the other end of the quill travel shaft a stop holder is mounted having a spring pressed stop which is engageable with an adjustable screw mounted on the side of the spindle housing.

The upper portion of the spindle is guided by spaced bearings and the lower part is rotatably received within a quill which is axially slideable in a quill housing. Within the quill the spindle is mounted for rotation by bearings which are held against axial movement.

A quill housing is shiftable vertically on the column and may be locked in position by a clamping nut, the handle of which extends through an opening in the quill housing.

With further reference to the drawings, the illustrated embodiment includes a base 10 at one side of which a work holding table assembly 11 is mounted. The table has a lower section 12 which is slideably mounted on the base for movement in one direction and an upper section 13 which is slideably mounted on the lower for movement at right angles. Hand wheels 14 and 15 are provided for operating conventional screw feeds (not shown) for moving the sections of the table. Position indicating dials 16, 17 are also provided for accurate positioning of the sections according to coordinates.

Extending vertically from the rear portion of the table is a column 20 comprised of a vertical housing 21 rigidly secured at its lower end to the base 10. The column has an inspection door 22 in its side. A support 23 extends from the back wall of the housing adjacent to its lower end for supporting a drive motor 25. The motor may be of various types, the one illustrated being a Graham (Patent 2,535,409) variable speed drive having a speed adjusting control lever 26 on its upper portion. The front end of the motor extends through an opening 27 in the back wall of the column and has a stub drive shaft 28 to which a pair of V belt pulleys 29 are keyed.

V belts 30 extend upwardly from the pulleys 29 through opening 31 in the top wall of the column and engage a pair of sheaves 32 on a main drive shaft 33.

The main drive shaft 33 is mounted in suitable bearings within a transmission housing 34. The transmission housing has a narrow rear portion 35 which fits on the top wall of the column 20, and a wider forward portion 36 which projects forwardly from the column and overhangs the work table. The main drive shaft is supported at its rear by bearings 37, 38 and at its forward portion by bearings 39, 40.

Intermediate the bearings 38 and 39 is a positive drive clutch 41 of conventional structure which is operable by a shoe shifter connected to an arm 43 mounted on a shaft 44; the shaft 44 extends through an opening in the left side of the transmission housing, and is connected to a brake shifter lever 45 within reach of the operator. The clutch 41 is of the positive drive type which permits slippage under excessive load in order to prevent injury to the driving mechanism. The brake provides for rapid stopping of the feed mechanism and the spindle so that the operator has fast stoppage control of the machine. The use of the combination clutch and brake reduces the inertia effect of the motor and other mechanism which would otherwise continue to drive the feed and the tool and therefore a substantial advantage is obtained.

At the forward end of the main drive shaft 33, a mitre gear 50 is mounted for engagement with a mitre gear 51 on the spindle 52.

Mounted parallel to the main drive shaft of the transmission is a change speed shaft 53 which is supported in bearings 54, 55 at its ends. The change speed shaft has slideably keyed on it a dual or couplet gear 56 having a main gear 57 which is in constant engagement with a main drive gear 58 fixed on main drive shaft 33. At one side of the main gear 57 of the couplet 56 a smaller gear 59 is connected or formed integrally therewith and at the other side a ratchet gear 60 is provided.

On the rear portion of the change speed shaft a gear 67 having a ratchet gear 68 on its forward hub is rotatably mounted. The dual gear 56 is shifted by a shifter fork (not shown) connected to rod 69 pivotally connected to lever 70 on the front of the transmission housing. The end of the rod 70 is connected by clevis 71 to the side of the front face of the housing.

Mounted parallel to the main drive shaft and the change speed shaft in the same horizontal plane is a speed gear shaft 61. The speed gear shaft has gears 62, 63 and 64 of graduated sizes rigidly keyed on it for engagement with gears mounted on the change speed shaft. At the forward portion of the speed gear shaft a helical gear 65 is keyed and is rigidly positioned by being received on a reduced portion of the shaft and engaged by a spacer sleeve 66.

Accordingly, it will be apparent that the gear 58 drives shaft 61 at an intermediate speed through gears 57 and 63, when the dual gear 56 is in the position illustrated in Fig. 10. Outward movement of the lever 70 in order to move the gear 59 of the dual gear 56 into engagement with gear 64 reduces the driving speed; and inward movement of the lever 70 to engage ratchet gears 60 and 68 drives the shaft 61 through the gears 57, 67 and 62 at a higher speed.

With more particular reference to Figs. 4 and 6, it will be apparent that the helical gear 65 on speed gear shaft 66 drives helical gear 75 at the top of a vertical down-feed idler shaft 76, the lower portion of which is mounted in the vertical feed assembly housing or feed box 77. The feed box is mounted directly beneath the forwardly extending portion of the transmission housing and spaced forwardly from the top portion of the column 20. An access door 78 (Fig. 2) is provided on its right side.

The vertical down-feed idler shaft 76 has an upper portion 80 of enlarged diameter within the transmission housing, and a lower portion 81 within the feed box. Just beneath the upper portion 80 the shaft is mounted in bearing 82 carried in a cap 83 mounted in registering openings in the bottom wall of the transmission housing and the top wall of the feed box. The lower end of the reduced portion of the shaft 81 is mounted in bearing 84.

A helical gear 85, smaller than gear 75, is mounted on a further reduced portion of the shaft 81 intermediate its upper and lower mountings. The helical gear 85 drives mating helical gear 86 at its right as viewed from the front of the machine. Helical gear 86 is mounted at the forward portion of a reverse feed shaft 87 which drives a small helical gear 88 at its rearward portion by means of a positive action clutch 89 of the same type as clutch 41. The shifter arm 90 of the clutch is operated by lever 92 at the upper right as one faces the machine. Reverse feed shaft 87 is supported at its ends by bearings 93, 94, the shaft being accessible from either end as indicated in the drawing.

Helical gear 88 meshes with a larger helical gear 95 rigidly mounted on a down-feed sleeve 96 within the feed box. Sleeve 96 has an enlarged upper end 97 which rests on bearing 98, carried by cap 99 in registering openings in the bottom wall of the transmission and the upper wall of the feed box. The lower portion of the sleeve 96 is threaded to receive nut 100 having an outer flanged portion 101 engaging the outer race 102 of a thrust bearing 103. The inner race 104 of the bearing engages the spacer 105 which is engaged with a washer 106 next to the hub of gear 95 which is keyed on a reduced portion of the sleeve 96 and thus maintained in position.

Sleeve 96 has a pair of oppositely disposed keyways extending internally from its threaded portion downwardly and parallel to its axis for mating with L-shaped keys 107 engaged with keyways 108 in down-feed shaft 109 which is received within the sleeve 96.

The lower end of the down-feed shaft 109 is received within a spindle assembly or quill housing 110 as indicated more particularly in Figs. 6, 8 and 9. The quill housing has a back wall 111 having a pair of parallel ridges 112 which are received within guide races 113 on the front face of the column housing. For holding the ridges in intimate association with the grooves, bolt 115 is received within a vertical slot 116 formed between plates 117 on the column front wall. The other end of the bolt is threaded to receive a locking nut 118 connected to lever 119 which extends through an opening 120 in the left wall 121 of the spindle assembly housing. The lever 119 is conveniently accessible to an operator so that it may be loosened to permit relative movement of the quill housing on the column. The front wall of the quill housing has a cylindrical portion 123 for receiving the quill and spindle.

As previously indicated, the lower end of the down-feed shaft 108 extends into the quill housing. At its lower end the down-feed shaft has a bevel gear 125 which is held in spaced relation from bearing 126 by spacer 127. With more particular reference to Fig. 9, bevel gear 125 is in constant engagement with oppositely disposed bevel gears 128, 129, these being rotatably mounted on reverse speed shaft 130 within the quill housing. The reverse speed shaft 130 is supported at its ends by bearings 131, 132 in the rear and front walls of the quill housing, respectively.

In order to rotate shaft 130 in either direction a friction hub or double clutch 134 is slideably keyed to shaft 130 intermediate bevel gears 128, 129. The friction hub 134 is operated by a yoke 135 to which handle 136 is attached, the handle having spaced depressions 137 engageable by a spring pressed detent 138 in the side wall of the housing. The yoke has three positions, the intermediate one being neutral in which no movement is transmitted.

At the forward portion of shaft 130 a worm 140 is secured in position by spacers 141, 142 at either end thereof. The forward end of the shaft 130 extends through an opening 142 in the front wall of the quill housing and has a hand wheel 143 connected thereto for manually turning the worm 140.

Positioned directly above the worm 140 within the housing is a worm wheel 144 which is rotatably mounted on a quill travel shaft 145. The right hand portion of the quill travel shaft has a friction hub 146 keyed thereon and is supported in bearing 147 in the wall of the housing, the worm wheel 144 having a conical recess 148 which receives the mating end of the hub 146.

The right hand end of shaft 145 is threaded at 149 to receive a worm gear clamp nut 150 which controls the positioning of the hub 146 and therefore its engagement with the recess in the worm wheel. The friction hub 146 has its right end threaded at 151 for receiving a hand wheel clamp nut 152 by means of which a hand wheel 153 may be urged inwardly. The hand wheel 153 is keyed for limited axial movement on friction hub 146 and has a hub 154 with a bevelled inner surface 155 for frictional engagement with a recess of a dial quill travel indicator 156; the indicator is restrained from inward movement by flange 157 on the hub 146. Mounted adjacent to the travel indicator is a zero dial 158 within which the bearing 147 is mounted for receiving the friction hub 146.

In order to drive the shaft 145 by means of the worm wheel 144, it is necessary to tighten the worm gear clamp knob 150 thus forcing the friction hub 146 into engagement with the worm gear. Similarly, in order to engage the quill travel indicator for movement, it is necessary to tighten the hand wheel nut 152 so that the hand wheel is frictionally engaged with the quill travel indicator. It is also possible to turn the shaft 145 manually using the hand wheel 153 without such movement being resisted by engagement of the worm wheel and its worm. This is accomplished by having the worm gear clamp knob 150 loosened so that there is no frictional engagement between the friction hub 146 and the worm gear. Since the hand wheel is slideably keyed to the friction hub which in turn is slideably keyed to the shaft 145 rotation of the hand wheel will produce rotation of the shaft.

The left portion of the quill travel shaft 145 has integrally formed on it a pinion 162. The pinion is rigidly positioned opposite the quill receiving portion 163 of the housing as follows:

Nut 164 engages sleeve 165 on one side and the inner race 166 of thrust bearing 167 on the other side; the outer race of thrust bearing 167 is engaged by flange 168 of the inner wall 169 of the housing. Similarly, at the other end nut 171 engages the inner race 172 of thrust bearing 173, the outer race 174 being engaged by flange 175 of the inner wall 169 of the housing.

In order to be able to stop the downward movement of the spindle at a predetermined position, a stop and stop engaging member are provided. With more particular reference to Figs. 8, 11 and 12, the outer left end of shaft 145 has a stop holder 180 mounted thereon and maintained in position by nuts 182. The stop holder is connected to a backing plate 181 by fastening means 184. The stop holder and backing plate are held in axial position on the shaft 145 by being compressed between the nuts 182 and a shoulder on an enlarged portion 185 of the shaft. The holder is frictionally held against rotation on the shaft by the degree to which the fastener 188 connecting the spaced portions of the holder is tightened to close the gap 189 therebetween. The stop holder has a slot 190 providing access to the fastener 188.

A cam stop 191 is pivotally mounted on pin 192 between the sides of the stop holder and has a leaf spring 193 which tends to hold the stop in the outward position indicated in Fig. 12, but which permits it to be retracted. A guide block 195 is mounted on the side of the housing adjacent to the stop holder and has an adjusting screw 196 threadedly received within the guide block 195, the end of the screw providing an abutment for the cam stop 191. Stop nut 197 is mounted on adjusting screw 196 for holding it in the selected position. After initial adjustment of the stop holder on shaft 145 the adjusting screw may be set to engage the member 191 and thus stop its rotation when the cutter is at the desired height. When the cutter is raised more than one rotation of the shaft 145 the member 191 retracts within its holder and therefore does not interfere with such movement. The stop mechanism is designed for use during manual downward feed and in the event that it should be inadvertently used during power feed the holder can slip on shaft 145 without damaging the machine.

With more particular reference to Figs. 3 and 8, the quill travel shaft 145 drives pinion 162 which is engaged with rack 200 of the spindle assembly 201.

The spindle assembly includes a cylindrical quill housing portion 123 as previously described. Within the quill housing the quill 202 is slideably received, bushings 204 and 205 being provided at the lower end and bushings 206 and 207 nearer the upper end of the quill. The rear outer surface of the quill is of reduced thickness and flattened to receive the rack 200 which is attached thereto by fastening means 206. At the upper portion of the quill housing a plurality of telescopic sleeves 209, 210, 211 and 212 are provided to cover the quill and spindle throughout the extent of their traverse. The outer sleeve 212 is connected to the quill key 213 at the top of the quill housing and the innermost sleeve 209 is connected to the bearing housing 215 on the underside of the transmission housing. Since the upper ends of the sleeves are turned inwardly and the lower ends outwardly, lowering of the quill housing results in the telescopic extension of the cover.

Within the quill, the spindle 52 is constructed and mounted as follows: The spindle has an upper section 221 and a lower section 222, the lower end of which is machined at 223 to receive a cutting tool. The lower end of the upper section 221 is threaded at 224 and received within a correspondingly internally threaded section in the upper end of the lower spindle 222. The upper spindle has a pair of keyways 226, 227 on opposite sides thereof within which L-shaped keys 228, 229 which are engaged with bevel gear 51 are mounted. The bevel gear is rotatably supported on a spacer 230 and bearing 231, the latter of which is carried on the upper side of the bearing housing 215. Within the bearing housing 215 an elongated bearing 232 is provided for positioning the central portion of the spindle. The cap 235 for the bearing 232 carries a sprocket 236 at its rear over which a chain 237 passes and is connected at one end 238 to the quill cap 240.

Just beneath the quill cap a nut 241 is attached to the spindle and engages the inner race of an upper bearing 242, the outer race of which is engaged with the lower portion of the quill top cap. A second bearing 243 is positioned just beneath bearing 242 and has its inner race engaged with an elongated spacer 245. The other end of the spacer is engaged with the inner race of bearing 246 beneath which spacer 247 is engaged with the inner race of bearing 248 which in turn is engaged with the upper surface of the spindle head. The outer race of bearing 246 is engaged with spacer 250, the spacer being engaged with the outer race of bearing 248 which in turn is engaged with the quill bottom cap 252.

It will be apparent from the foregoing that the nut 241 maintains the intermediate bearings and spacers in rigid position on the exterior of the lower spindle. Similarly, the lower end of the lower spindle is held in rigid axial relationship with the quill as a result of the quill bottom cap being engaged with the intermediate spacer and bearings. Thus absolute accuracy of rotation and freedom from axial movement of the spindle in the quill is assured.

Accuracy of the spindle is further promoted by the reception of the upper spindle 221 and the elongated bearing 255 within the bearing housing 256 at the forward portion of the transmission housing. Dust cap 257 encloses the upper spindle and is connected by suitable fastening means 258 to the bearing housing 256.

In order to counterbalance the weight of the spindle assembly, a weight 260 is connected by a cable 261 to the quill housing at 262, the cable being wrapped around a drum 264 which is keyed to a shaft 265 mounted on the upper front portion of column 21. The drum may be rotated by a ship wheel 266 at the operator's right when the nut 118 is loosened sufficiently to permit movement of the housing on the column.

Similarly, in order to counterbalance the weight of the quill and spindle within the housing a smaller weight 270 is connected by a chain 271 which runs over idler sprocket 272 within the column and a second idler sprocket (not shown) on shaft 265 and then over sprocket 236 for connection to the quill cap 239.

In operating the machine, the operator first mounts the work on the table in accordance with conventional practice. After placing the desired cutting tool in the lower end of the spindle, the operator may lower the quill housing close to the work in order to provide for maximum lateral support of the tool close to the cutting area. This is done by loosening nut 118 by moving lever 119 at the operator's left and then turning the ship wheel 266 until the quill housing is at the desired elevation, the counterweights facilitating this adjustment. When the quill housing is at the desired elevation, the lever 119 is raised to prevent further movement of the quill housing on the column.

With the motor 25 providing power at the desired speed, the operator sets the bevel gear clutch feed lever 136 at the desired position—for downward feed when a hole is to be bored. The change speed gear transmission may then be set for the desired transmission ratio by adjustments of the lever 70, the clutches 42 and 89 being disengaged. The main clutch lever 45 may then be engaged to start the rotation of the spindle. After setting of the dial indicator and the friction hub clamp nut 50, the quill may then be moved downwardly by the driving means upon actuation of the handle 92 to cause engagement of the feed clutch.

For drilling to a predetermined depth, the feed clutch is disengaged. With the friction hub clamp nut tightened and the bevel gear friction clutch in neutral position, the quill may be fed either upwardly or downwardly according to the direction of the rotation of the hand wheel 143. The stop 190 may be adjusted on the shaft 145 to prevent downward movement of the quill beyond a predetermined position in order to accurately control the depth of holes bored by the machine, the stop being frictionally held on the shaft 145 so that damage to the machine will not result in the event that the machine is inadvertently power driven past the limit for which the stop is set. With the hand wheel clamp nut 152 tightened and the friction hub clamp nut loosened, the quill travel shaft 145 and the pinion 162 may be raised or lowered manually at rapid rate.

Accordingly, it will be understood that an improved boring machine is provided in which the fixed step transmission and cross feed mechanism, comprising the major portion of the machine by weight, are rigidly mounted and in which feed means for the quill is mounted beneath the transmission and drives the quill from a position adjacent to the cutting end of the spindle. The feeding means for the quill is mounted for power operation or alternatively for rapid or slow feed movement; an improved stop means is provided for use during the manual movement of the quill.

Although a specific embodiment of the invention has been described, it will be understood by those skilled in the art that the invention is not thus limited but only as defined in the following claims.

What is claimed is:

1. In a machine tool, a base, a work table on said base, a column extending upwardly from said base, a main drive shaft mounted on the top of said column and extending outwardly over the table, means in the column for driving said main drive shaft, a spindle driven directly from said main drive shaft, a quill carrying said spindle, a quill housing carrying said quill and mounted on said column, a clutch means in said main drive shaft, a change speed shaft driven from said main drive shaft, a down-feed shaft driven from said change speed shaft, a cross feed shaft driven from said down-feed shaft, clutch means in said cross feed shaft, a down-feed sleeve driven by said cross feed shaft, shaft means slideably mounted in said down-feed sleeve and keyed thereto, opposed bevel gears driven by said shaft means, a reverse cross feed shaft, means for rotating the reverse cross feed shaft in either direction from said bevel gears, a worm on said reverse cross feed shaft, a worm wheel driven from said worm, a quill travel shaft in driving relation with said quill, and means for driving said quill travel shaft from said worm wheel.

2. In a machine tool, a base, a work table on said base, a column extending upwardly from said base, a main drive shaft mounted on the top of said column and extending outwardly over the table, means in the column for driving said main drive shaft, a spindle driven directly from said main drive shaft, a quill carrying said spindle, a quill housing carrying said quill and mounted on said column, clutch means in said main drive shaft, a change speed shaft driven from said main drive shaft, a first down-feed shaft driven from said change speed shaft, a cross feed shaft driven from said first down-feed shaft, clutch means in said cross feed shaft, a second down-feed shaft driven by said cross feed shaft, gear means driven by said second down-feed shaft, a reverse cross feed shaft, means for rotating the reverse cross feed shaft in either direction from said gear means, a quill travel shaft in driving relation with said quill, and means for driving said quill travel shaft from said gear means.

3. In a machine tool having a base, a column extending upwardly from the base, driving mechanism extending outwardly from the column and over the base, a quill mounted beneath the driving mechanism, and means for driving the quill from the driving mechanism, said driving mechanism including a quill travel shaft, a worm wheel rotatably mounted on the quill travel shaft, a friction hub slideably keyed on the quill travel shaft and having a portion engageable with the worm wheel, means mounted on the travel shaft in engagement with the friction hub for urging it into frictional engagement with the worm wheel, and a worm operable by the driving mechanism for rotating the worm wheel, a hand wheel keyed for limited axial movement on the friction hub, a quill travel indicator rotatably mounted on the friction hub and frictionally engageable with the hand wheel for rotation therewith, and a hand wheel clamp engaged with the friction hub on the side of the hand wheel opposite the travel indicator whereby the clamp may urge the hand wheel into engagement with the travel indicator.

4. In a machine tool having power transmission means and a quill vertically moveable selectively by said power transmission means or manually, a quill housing, a quill travel shaft in said housing, means on said quill travel shaft for engaging said quill to produce positive movement thereof, a stop holder on said quill travel shaft, said stop holder comprising a housing having a radial slot therein, means for drawing the sides of the housing which define the slot together the desired amount in order to adjust the frictional engagement of the holder with the quill travel shaft, a cam stop moveably mounted on the stop holder, means urging the cam stop to outer operative position, an adjustable abutment means mounted on the housing in position to engage the cam stop when the latter is in operative position, said cam stop being retractable within the stop holder, and means for urging said cam stop into retracted position when the shaft is rotating in the direction for raising of the quill.

5. In a machine tool having power transmission means and a quill vertically moveable selectively by said power transmission means or manually, a quill housing, a quill travel shaft in said housing, means on said quill travel shaft for engaging said quill to produce positive movement thereof, a stop holder on said quill travel shaft, means to adjust the frictional engagement of the holder with the quill travel shaft, stop means moveably mounted on the stop holder, means urging said stop means to operative position, adjustable abutment means mounted on the housing in position to engage the stop means when the latter is in operative position, said stop means being retractable to inoperative position, and means for moving said stop means into retracted position when the shaft rotates in the direction for raising the quill.

6. In a machine tool having a column, power transmission means extending laterally from the column and a quill housing mounted beneath the power transmission means, a quill slideably mounted within the quill housing, a spindle rotatably mounted within the quill and extending upwardly thereabove, said spindle having a lower section with a tool-receiving head, the upper portion of the lower section being threaded internally and receiving the externally threaded lower end of the upper section, spaced elongated bearings engaged with the upper section, a nut threadedly engaged with the upper portion of the lower section, a first bearing immediately below the nut and having its inner race engaged thereby, a second bearing immediately beneath the first bearing, a first sleeve immediately beneath the second bearing and engaged with the inner race thereof, a third bearing immediately below the sleeve and engaged with the inner race thereof, a second sleeve immediately below the third bearing and engaged with the inner race thereof, and a fourth bearing immediately below the second sleeve and having its inner race engaged thereby, the inner race of the fourth bearing abutting the head of the spindle whereby the first, second, third, and fourth bearings are rigidly mounted on the spindle.

7. In a machine tool having a column, power transmission means extending laterally from the column and a quill housing mounted beneath the power transmission means, a quill slideably mounted within the quill housing, a spindle rotatably mounted within the quill and extending upwardly thereabove, said spindle having a tool-receiving head, a nut threadedly engaged with the upper portion of the spindle, bearing mean simmediately below the nut and having its inner race engaged thereby, a first sleeve immediately beneath the bearing means and engaged with the inner race thereof, a second bearing means immediately below the sleeve and engaged with the inner race thereof, a second sleeve immediately below the second bearing means and engaged with the inner race thereof, and a third bearing means immediately below the second sleeve and having its inner race engaged thereby, the inner race of the third bearing means abutting the head of the spindle whereby the first, second, and third bearing means are rigidly mounted on the spindle.

8. In a machine tool, according to claim 7, the quill having a cap threadedly engaged at its top, the cap having an annular flange extending downwardly therewithin, the annular flange engaging the outer race of the first bearing means, the quill having a bottom cap threadedly engaged with the lower end of the quill, the bottom cap having an annular flange extending upwardly therewithin, the annular flange engaging the outer race of the third bearing means, a spacer positioned intermediate the outer races of the second and third bearing means and in engagement therewith, the inner wall of the quill having stop means engageable with the upper side of the outer race of the second bearing means.

9. In a machine tool, a quill travel shaft, driven means rotatably mounted on said shaft, a friction hub slideably keyed on said shaft and engageable with said driven means, a quill travel indicator rotatably mounted on the friction hub, means limiting axial movement of the indicator on said hub, said indicator having first clutch means, a hand wheel keyed to said friction hub and having limited axial movement, said hand wheel having second clutch means engageable with said first clutch means, means for urging said hand wheel into engagement with said quill travel indicator for producing rotation of said travel indicator, and other means mounted on the shaft and engageable with the friction hub on the side of the hand wheel opposite the travel indicator whereby the friction hub may be urged into engagement with said driven means.

10. In a machine tool having a base, a column extending upwardly from the base, driving mechanism extending outwardly from the column and over the base, a quill mounted beneath the driving mechanism, and means for driving the quill from the driving mechanism, said driving mechanism including a quill travel shaft, a worm wheel rotatably mounted on the quill travel shaft, a friction hub slideably keyed on the quill travel shaft and having a portion engageable with the worm wheel, means mounted on the travel shaft for urging the friction hub into frictional engagement with the worm wheel, a cross feed shaft, a worm mounted on the cross feed shaft and operable for rotating the worm wheel, opposed bevel gears rotatably mounted on the cross feed shaft, a bevel gear engaged with the opposed bevel gears and operable from the driving mechanism, a friction clutch slidably mounted on the cross feed shaft intermediate the opposed bevel gears, means for moving the friction clutch into alternate engagement with either of the opposed bevel gears for rotating said cross feed shaft in either direction or for positioning said friction clutch intermediate the opposed bevel gears and out of frictional engagement therewith, and a hand wheel connected to said cross feed shaft for manually rotating it and the worm when said friction clutch is in neutral position.

11. In a machine tool having a base, a column extending upwardly from the base, driving mechanism extending outwardly from the column and over the base, a quill mounted beneath the driving mechanism, and means for driving the quill from the driving mechanism, said driving mechanism including a quill travel shaft, a worm wheel rotatably mounted on the quill travel shaft, a friction hub slideably keyed on the quill travel shaft and having a portion engageable with the worm wheel, means mounted on the travel shaft for urging the friction hub into frictional engagement with the worm wheel, a worm operable by the driving mechanism for rotating the worm wheel, a hand wheel keyed for limited axial movement on the friction hub, the friction hub having an annular flange, a quill travel indicator rotatably mounted on the friction hub and frictionally engageable with the hand wheel for rotation therewith, the annular flange limiting axial movement of the indicator, a housing, a zero dial indicator mounted on the housing adjacent to the travel indicator, and a hand wheel clamp nut threadedly engaged with the friction hub on the side of the hand wheel opposite the travel indicator whereby the clamp nut may be threaded onto the friction hub in order to urge the hand wheel into engagement with the travel indicator.

References Cited in the file of this patent

UNITED STATES PATENTS

| | | |
|---|---|---|
| 150,890 | Prouty | May 12, 1874 |
| 151,912 | Reed | June 9, 1874 |
| 214,035 | Harrington | Apr. 8, 1879 |
| 315,049 | McFarlan et al. | Apr. 7, 1885 |
| 514,719 | Libby | Feb. 13, 1894 |
| 543,395 | Mill | July 23, 1895 |
| 1,074,906 | Sosa | Oct. 7, 1913 |
| 1,225,745 | Barnes | May 15, 1917 |
| 1,434,564 | Ruetschi | Nov. 7, 1922 |
| 1,560,776 | Gifford et al. | Nov. 10, 1925 |
| 1,637,759 | Allen | Aug. 2, 1927 |
| 1,746,263 | Klausmeyer | Feb. 11, 1930 |
| 1,865,375 | Kingsburg | June 28, 1932 |
| 1,972,359 | Schenck | Sept. 4, 1934 |